Reissued Nov. 29, 1927. Re. 16,803

UNITED STATES PATENT OFFICE.

EDMUND M. FLAHERTY, OF PARLIN, NEW JERSEY, ASSIGNOR TO E. I. DU PONT DE NEMOURS & COMPANY, OF WILMINGTON, DELAWARE, A CORPORATION OF DELAWARE.

LOW-VISCOSITY LACQUER AND FILM PRODUCED THEREFROM.

No Drawing. Original No. 1,629,999, dated May 24, 1927, Serial No. 471,931, filed May 23, 1921. Application for reissue filed September 19, 1927. Serial No. 220,623.

This invention relates to low viscosity lacquers and films produced therefrom, and more particularly to lacquers made from cellulose esters or nitrates having a greatly reduced viscosity and containing resins or oils that will impart such qualities to the lacquers that, upon drying in two or three coats, films will result that will be hard, durable, tough, and adhesive, together with other valuable properties.

It is an ultimate object of my invention to provide a film whose principal constituent will be a cellulose nitrate, which film will possess the characteristics of hardness, durability, toughness, transparency, freedom from acidity, lustre, and capability of adhesion to a surface to be coated; and which will at the same time be built up of only two or three layers or coats. A further object in this connection is to utilize cellulose nitrates which have been greatly reduced in viscosity, but which have not been reduced to the point that the nitrogen content is degraded and the transparency and solubility of the cellulose nitrate impaired. A further object is to prepare lacquer and enamel compositions that will, upon drying, provide a film as aforesaid possessing a continuous unbroken appearance. Further objects of the invention will appear as the following description proceeds.

According to my invention pyroxylin solutions, and particularly lacquers, having an abnormally high nitrocellulose content in conjunction with a suitably low viscosity are produced by subjecting pyroxylin mixtures of the character hereinafter described, for a prolonged period, say from one to three weeks, preferably at ordinary room temperature, to the action of a metal salt of a weak acid, for example an alkali-forming metal acetate. The discovery of the action of salts of this kind on the viscosity of pyroxylin solutions is described in the patent of Earle C. Pitman No. 1,636,319, and the application of this discovery to the reduction of viscosity of pyroxylin solutions is claimed broadly therein. By a particular application of this discovery to high percentage pyroxylin solutions, I have found it practicable to produce solutions, such as lacquers and colored enamels, of such a high pyroxylin content that they will deposit in two coats a film as heavy and satisfactory as the ordinary solutions do in four coats or more.

My invention may be illustrated in detail by the following examples:

I. I first make up a solution of from 25 to 30% pyroxylin in suitable solvents. A typical pyroxylin base solution for this purpose may be made according to the following formula:

| | Parts. |
|---|---|
| Amyl acetate | 11 |
| Amyl alcohol | 5 |
| Acetone | 35 |
| Toluene | 14 |
| Denatured alcohol | 5 |
| Pyroxylin | 28 |

To this mixture is added .56 part by weight of crystalline sodium acetate preferably dissolved in methyl alcohol. The amount of sodium acetate added may with advantage be from about 0.1 to 3% of the weight of pyroxylin in the solution; I preferably use 2%.

The resulting mixture is allowed to stand several weeks in a warm room and at the end of this time the viscosity is found to have dropped to a very low point, too low even for most purposes. I then add a slight amount of heavy viscosity pyroxylin which brings the solution viscosity up to a suitable working point where it stays indefinitely, there being no further action of the sodium acetate. To the solution containing a very high percentage of pyroxylin I now add suitable gums, oils and colors to impart extra adhesiveness, flexibility and shade as desired. Thus, after the viscosity has been reduced to a minimum and brought back to a suitable point, a lacquer can then be prepared by making a mixture containing 56% of this base solution, 9% of castor oil and 35% of a 50% gum solution in suitable solvents. This gum may be dammar, shellac or any of the other common gums used in lacquers. Dammar may first be dissolved in a mixture of toluene and benzene. Shellac may be used in the form of its solution in alcohol. Instead of castor oil, various other vegetable oils, such as blown cotton-seed oil, may be added to impart flexibility to the coating.

In a similar way a colored enamel can be made from the original base solution by the addition of pigments ground in oil.

II. Instead of preparing the base solution of high percentage pyroxylin and correct viscosity in two steps, I may prepare it in one step by mixing all the pyroxylin with the solvent at the start, adding about 2%, based on the weight of pyroxylin, of sodium acetate, and allowing to stand, until the reduction in viscosity has progressed to the desired extent. The amount of pyroxylin added in this alternative procedure may be such, for example, that the resulting mixture will contain from about 30 to 40% of pyroxylin. After adding the sodium acetate the mixture is preferably allowed to stand at room temperature for about three weeks. Where less than 2% of sodium acetate is used, a longer time will be required.

By following the procedure set forth in the above examples a 25 to 40% pyroxylin solution may be obtained having a viscosity below 25,000 centipoises, as determined in the Stormer viscosimeter, at 28° C., 25,000 centipoises being practically the upper limit for any commercial solution which is to be used for coating without thinning. A centipoise is a c. g. s. unit of viscosity, water being about 1 centipoise at 20.2° C. Such solutions will, as a rule, be considerably diluted with solvents before being used in spraying or brushing surfaces to be coated.

In place of sodium acetate various other substances may be used as viscosity-reducers, either singly or two or more together. The alkali-metal formates and acetates are especially useful, and the alkaline earth metal salts, as well as the cadmium, cobalt, and zinc salts, of these same acids have a marked effect on the viscosity of pyroxylin solutions. In general, of the salts of organic acids, the water-soluble salts of the lower monobasic aliphatic acids appear to act as the best viscosity-reducers. Salts of some inorganic acids also exhibit this property, as for example the alkali-metal borates, iodides, sulphocyanates, etc.

The pyroxylin solutions coming within the purview of my invention are, of course, not confined to the particular solvent mixture given in the above examples. Thus instead of amyl acetate and amyl alcohol, I may use butyl acetate and butyl alcohol, respectively; and in place of toluene, the other benzenoid hydrocarbons such as benzene and xylene may be used. In fact any of the well-known solvent mixtures may be substituted for the one mentioned in the above examples without departing from my invention, said mixtures usually comprising a diluent such as benzene.

The maximum pyroxylin content of pyroxylin solutions which have heretofore been of practical use for coating purposes, has been about 15%, whereas the solutions made according to my invention will contain as a rule, if undiluted, more than 20% of pyroxylin, and in many cases between 25 and 40%. The above figures of 15% and 20% have particular reference to pyroxylin which has been dissolved in a mixture of solvents instead of in a single solvent. Such solutions may, of course, be diluted with solvents for spraying or brushing purposes.

The new lacquer is differentiated from cellulose nitrate lacquers heretofore known in that it contains at least 25% and sometimes from 50 to 150% more cellulose nitrate at a given viscosity than does a corresponding lacquer of the same viscosity and having the maximum content of cellulose nitrate which has not been subject to the above subscribed treatment with sodium acetate or a similarly functioning agent.

My new lacquer may be differentiated from prior lacquers by stating that the viscosity-characteristic of the nitrocellulose in the new lacquer is substantially lower than that of the nitro-cellulose contained in the lacquers heretofore known. This distinctive feature of the new lacquer makes it possible to identify the same irrespective of the extent to which the new lacquer is modified or thinned by the addition of gums, volatile solvents or diluents, etc. The above-mentioned viscosity-characteristic of the pyroxylin component of the new lacquer may advantageously be defined in terms of the viscosity that it imparts to some convenient solution taken as a standard when measured by a standard method. I have found it desirable to express this inherent viscosity-characteristic in terms of the viscosity possessed by a 16 ounce ethyl acetate solution of the reduced viscosity nitrocellulose when measured by the Stormer viscometer, at 28° C. Thus, a 25% pyroxlin solution having the solvent composition set forth in Example I above, and having a viscosity of 25,000 centipoises, as determined in the Stormer viscometer at 28° C., using a 500 g. weight, contains nitrocellulose which, when dissolved in toto in pure ethyl acetate (over 99.5%) to form a 16 oz. solution, imparts to said ethyl acetate solution a viscosity of about 1200 centipoises when tested in said viscometer at 28° C. In the preferred embodiment the lacquers and base solutions constituting my invention are consequently clearly differentiated from the lacquers of the prior art by containing, for their pyroxylin content, nitrocellulose whose inherent viscosity-characteristic is such that when said nitro cellulose is dissolved in pure ethyl acetate to form a 16 oz. solution, said solution possesses a viscosity of less than 1200 centipoises when tested in the Stormer viscometer at 28° C. (using a 500 g. weight), and generally the said lacquers and solutions are distinguished over the prior art by containing a nitrocellulose whose inherent viscosity characteristic is such that at above 20% concentration in a mixed solvent of the character described in Example I, it will provide a solution below 25,000 centipoises in viscosity.

I use the expression (1) "16 oz. solution" and (2) "16 oz. ethyl acetate solution" in the sense customary in the art of pyroxylin solutions, that is, to mean (1) 16 ounces of nitro-cellulose dissolved in 1 gallon of solvent, and (2) 16 ounces of nitrocellulose dissolved in 1 gallon of ethyl acetate, respectively, at ordinary room temperature (22° C.).

When the new solutions hereinbefore described are used to coat various kinds of surfaces, particularly rigid metal or wood surfaces, to provide films thereon, either by spraying, brushing or dipping, the resulting films will be hard, durable, lustrous, transparent, tough, and continuous, and will adhere to the underlying surface. These films may be made of proper and sufficient thickness by the application of two or three coats, whereas in former practice where high viscosity nitrocellulose was used, a much larger number of coats had to be applied to obtain a film of sufficient thickness. My new films are particularly characterized by their toughness, i. e., the absence of any brittleness, this result being achieved by the admixture of the ingredients of the lacquer or enamel, with nitrocellulose, whose viscosity has been reduced by means of sodium acetate, or its equivalent in function, whereby the nitrogen content is not seriously reduced and correspondingly the resulting solubility of the nitrocellulose and toughness of the film remains substantially unimpaired. The use of the sodium acetate, which has an alkaline reaction, and the absence of acidic products in the low viscosity solutions or lacquers, permits of the addition of basic pigments without liability of incurring undesirable reactions.

It will, therefore, be apparent that I have provided lacquers and enamels containing a much higher proportion of nitrocellulose for a given viscosity than was hitherto possible, without in any way impairing the aforesaid characteristics of the film to be prepared, while at the same time making possible the easy application of these lacquers and enamels upon surfaces to be coated. As a result, films of the aforesaid excellent characteristics may be prepared, by the application of only two or three coats of my new lacquers or enamels, whereas in the old art it was necessary to put on many more coats in order to build up a film of proper and suitable thickness, this latter difficulty having been due to the necessary low nitrocellulose content of the prior art solutions at a working viscosity.

As many apparently widely different embodiments of this invention may be made without departing from the spirit thereof, it is to be understood that I do not limit myself to the foregoing examples, except as indicated in the appended claims.

I claim:

1. A pyroxylin coating composition comprising nitrocellulose, a softener therefor, and a volatile nitrocellulose-solvent, the viscosity-characteristic of the nitrocellulose, expressed as the viscosity of a 16 oz. solution thereof in C. P. ethyl acetate, being less than 1200 centipoises when measured by the Stormer viscometer at 28° C.

2. A pyroxylin coating composition comprising nitrocellulose, a softener therefor, a gum, and a volatile solvent for the three first mentioned ingredients, said nitrocellulose, when 16 ounces thereof is dissolved in 1 gallon of pure ethyl acetate, yielding a 16 oz. solution whose viscosity is less than 1200 centipoises when measured by the Stormer viscometer at 28° C.

3. A pyroxylin coating composition comprising nitrocellulose, a volatile nitrocellulose-solvent, a softener for the nitro-cellulose, a gum, and a pigment, said nitrocellulose, when 16 ounces thereof is dissolved in 1 gallon of pure ethyl acetate, yielding a 16 oz. solution whose viscosity is less than 1200 centipoises when measured by the Stormer viscometer at 28° C.

4. A coating composition comprising cellulose nitrate having an inherent viscosity characteristic such that at 25% concentration in a mixed solvent of the composition hereinbefore described it will provide a solution below 25000 centipoises in viscosity, and comprising also a resin and a solvent.

5. A composition comprising cellulose nitrate having a viscosity, as determined upon a 16 oz. solution of ethyl acetate with the Stormer viscometer at 28° C., of less than 1200 centipoises, and comprising also a resin and a solvent.

6. A coating composition comprising cellulose nitrate having an inherent viscosity characteristic such that at 25% concentration in a mixed solvent of the composition hereinbefore described it will provide a solution below 25000 centipoises in viscosity, and comprising also a resin, an oil, and a solvent.

7. A composition comprising cellulose nitrate having a viscosity, as determined upon a 16 oz. solution of ethyl acetate with the Stormer viscometer at 28° C., of less than 1200 centipoises, and comprising also a resin, and solvents to bring the viscosity of the composition below 25000 centipoises.

8. An article covered with a hard, durable, tough, and adhesive film formed from a composition comprising a cellulose nitrate having an inherent viscosity characteristic such that at 25% concentration in a mixed solvent of the composition hereinbefore described it will provide a solution below 25000 centipoises in viscosity, and comprising also a resin.

9. A composition comprising cellulose nitrate having a viscosity, as determined upon a 16 oz. solution of ethyl acetate with the Stormer viscometer at 28° C., of less than 1200 centipoises, and comprising also a solvent and a resin, said composition being adapted upon drying of not over three coats to form a hard, durable, tough, and adhesive film.

10. A composition comprising cellulose nitrate having a viscosity, as determined upon a 16 oz. solution of ethyl acetate with the Stormer viscometer at 28° C., of less than 1200 centipoises, and comprising also a solvent, a resin, and a basic pigment, said composition being non-acidic whereby no reaction occurs with said pigment, and said composition being adapted upon drying of not over three coats, to form a hard, durable, tough, and adhesive film.

11. An article covered with a hard, durable, tough, and adhesive film formed from a composition comprising a cellulose nitrate having a viscosity, as determined upon a 16 oz. solution of ethyl acetate with the Stormer viscometer at 28° C., of less than 1200 centipoises, and comprising also a resin and a solvent.

12. An article covered with a hard, durable, tough, and adhesive film formed from a composition comprising a cellulose nitrate having a viscosity, as determined upon a 16 oz. solution of ethyl acetate with the Stormer viscometer at 28° C., of less than 1200 centipoises, and comprising also a resin, an oil, and a solvent.

13. A composition comprising cellulose nitrate having an inherent viscosity characteristic such that at above 20% concentration in mixed solvent of the composition hereinbefore described it will provide a solution below 25000 centipoises in viscosity, and comprising also a resin and a solvent.

14. A composition comprising cellulose nitrate having an inherent viscosity characteristic such that at above 20% concentration in mixed solvent of the composition hereinbefore described it will provide a solution below 25000 centipoises in viscosity and comprising also a resin and solvents to bring the viscosity of the total composition below 25000 centipoises.

15. An article covered with a hard, durable, tough, non-shrinking and adhesive film formed from a composition comprising a cellulose nitrate having a viscosity characteristic such that at above 20% concentration in mixed solvent of the composition hereinbefore described it will provide a solution below 25000 centipoises in viscosity, and comprising also a resin.

16. An article coated with a hard, durable, tough, and adhesive film formed from a composition containing a resin, a softener, and a cellulose nitrate having a low viscosity characteristic such that at above 20% concentration in mixed solvent of the composition hereinfore described it is capable of producing a solution below 25000 centipoises in viscosity.

17. A rigid article coated with a hard, durable, tough, and adhesive colored enamel formed from a composition containing a resin and a cellulose nitrate having an inherent viscosity characteristic such that at 25% concentration in a mixed solvent of the composition described in Example I the latter will have a viscosity below 25000 centipoises.

In testimony whereof, I affix my signature.

EDMUND M. FLAHERTY.

DISCLAIMER

Re. No. 16,803.—*Edmund M. Flaherty*, Parlin, N. J. LOW-VISCOSITY LACQUER AND FILM PRODUCED THEREFROM. Patent dated November 29, 1927. Disclaimer filed May 26, 1932, by the assignee, *E. I. du Pont de Nemours & Company.*

Hereby enters this disclaimer to that part of said specification and claims which is in the following words: to wit: "and generally the said lacquers and solutions are distinguished over the prior art by containing a nitrocellulose whose inherent viscosity characteristic is such that at above 20% concentration in a mixed solvent of the character described in Example I, it will provide a solution below 25,000 centipoises in viscosity". (P. 3, 11.2–9.)

"13. A composition comprising cellulose nitrate having an inherent viscosity characteristic such that at above 20% concentration in mixed solvent of the composition hereinbefore described it will provide a solution below 25,000 centipoises in viscosity, and comprising also a resin and a solvent.

"14. A composition comprising cellulose nitrate having an inherent viscosity characteristic such that at above 20% concentration in mixed solvent of the composition hereinbefore described it will provide a solution below 25,000 centipoises in viscosity and comprising also a resin and solvent to bring the viscosity of the total composition below 25,000 centipoises.

"15. An article covered with a hard, durable, tough, nonshrinking, and adhesive film formed from a composition comprising a cellulose nitrate having a viscosity characteristic such that at above 20% concentration in mixed solvent of the composition hereinbefore described it will provide a solution below 25,000 centipoises in viscosity, and comprising also a resin.

"16. An article coated with a hard, durable, tough, and adhesive film formed from a composition containing a resin, a softener, and a cellulose nitrate having a low viscosity characteristic such that at above 20% concentration in mixed solvent of the composition hereinbefore described it is capable of producing a solution below 25,000 centipoises in viscosity."

[*Official Gazette June 14, 1932.*]